Figure 3:
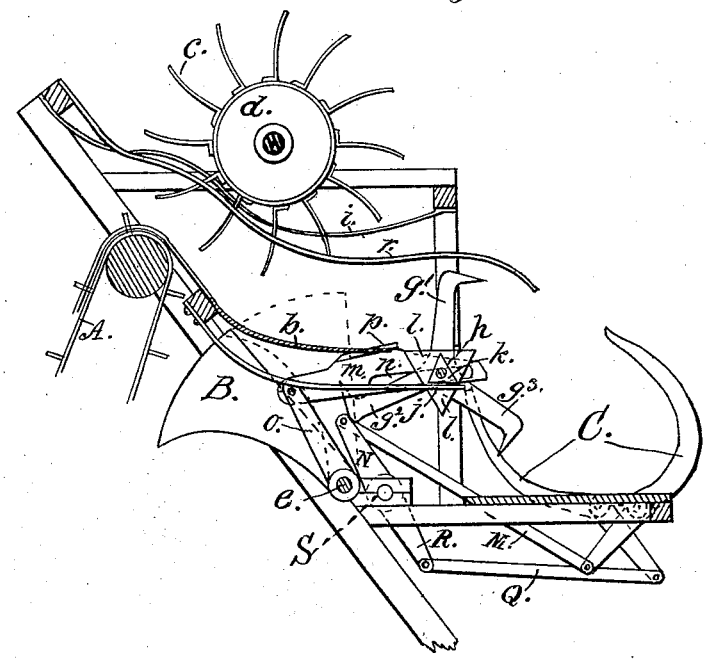

(No Model.) 2 Sheets—Sheet 1.
M. HEDRICK.
BINDER ATTACHMENT FOR HARVESTERS.
No. 280,619. Patented July 3, 1883.
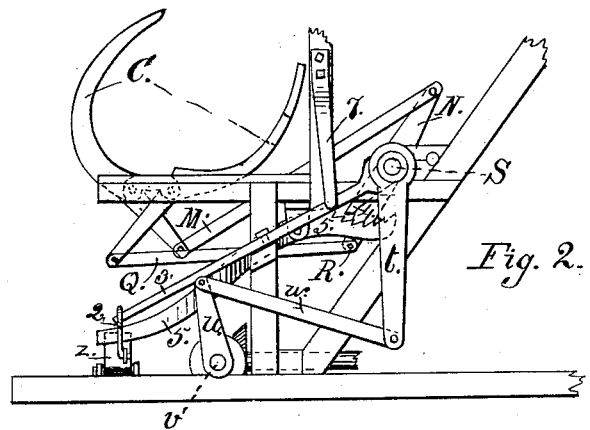
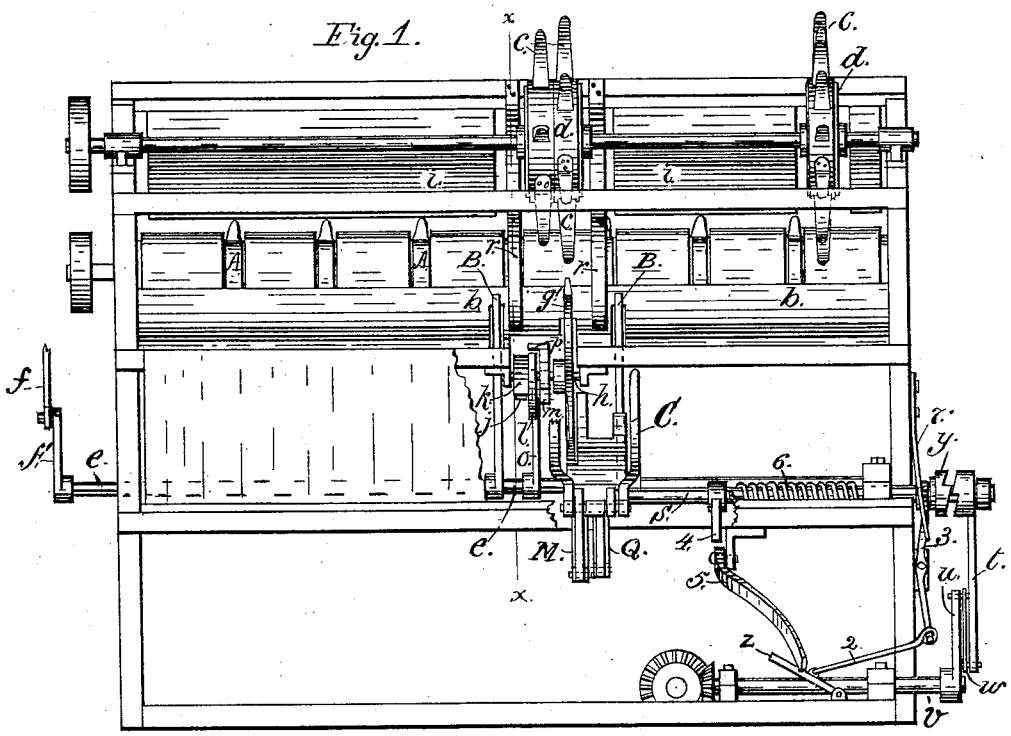
WITNESSES:
Frank A. Jacob.
A. M. Hood.
INVENTOR:
Mason Hedrick
By H. P. Hood
Atty (No Model.) 2 Sheets—Sheet 2.

M. HEDRICK.
BINDER ATTACHMENT FOR HARVESTERS.

No. 280,619. Patented July 3, 1883.

WITNESSES:
A. M. Hood.
Frank A. Jacob.

INVENTOR:
Mason Hedrick.
By H. P. Hood
Atty.

UNITED STATES PATENT OFFICE.

MASON HEDRICK, OF OAKLAND CITY, INDIANA, ASSIGNOR OF ONE-HALF TO HEZEKIAH C. WARD, OF SAME PLACE.

BINDER ATTACHMENT FOR HARVESTERS.

SPECIFICATION forming part of Letters Patent No. 280,619, dated July 3, 1883.

Application filed September 23, 1882. (No model.)

*To all whom it may concern:*

Be it known that I, MASON HEDRICK, a resident of Oakland City, in the county of Gibson and State of Indiana, have invented a new and useful Improvement in Binder Attachments for Harvesters, of which the following is a specification, having reference to the accompanying drawings.

This invention is an improvement on a device for a like purpose for which Letters Patent of the United States No. 250,915 were granted to me December 13, 1881; and it relates to improved attachments to harvesters by the aid of which one man riding in a seat secured to the binder-frame can bind grain as fast as a harvester can cut it.

My invention consists in an improved mechanism for automatically gaging the size of the gavels and delivering them when formed to the compressing-arms for binding.

It also consists in an improved mechanism for controlling the movement of the arms for compressing the gavel to receive the band, all as hereinafter more fully set forth, and particularly pointed out in the claims.

Figure 1 is a side elevation, showing my improvements mounted in place on the frame of a harvester. Fig. 2 is a partial end view, showing the mechanism for operating and controlling the arms for compressing the gavel ready for binding. Fig. 3 is a vertical section through $x\ x$, Fig. 1, showing the mechanism for forming the grain into gavels and for delivering the same to the compressing-arms.

Like letters refer to the same parts in all figures.

A represents the elevator of usual form, by means of which the cut grain is elevated from the platform of the harvester and delivered on the sloping curved apron $b$, down which it passes by force of gravity aided by the elastic radial arms $c\ c$ on the wheels $d\ d$, which arms also operate to straighten the straw, feed it to the packer, and prevent its rebounding from the packers as it moves forward. For the purpose of making the action of the arms $c\ c$ more yielding and elastic than it would be if said arms were rigidly secured to the periphery of wheels $d\ d$, I attach said arms to an elastic band which closely fits the periphery of said wheels. The wheels $d\ d$ are mounted on a shaft, which is caused to revolve by a suitable connection with the driving mechanism of the elevator.

B B are vibrating packing-arms secured to a rocking-shaft, $e$, which shaft is rocked by the rod $f$, connecting the arm $f'$ on said rock-shaft with a crank-wheel, (not shown,) which receives its motion from the belt driving the elevator. The upper ends of the arms B B project through slots in the apron $b$, and are made wide, so as to prevent the grain from falling behind them. The outward and downward movement of the grain is arrested by one of the radial arms $g'\ g^2\ g^3$, which arms are connected to a central hub secured to a short shaft, $h$, which is mounted in suitable bearings on the frame, as shown. One of said arms is maintained in an upright position across the opening of the chute formed by the apron $b$ and top covering, $i$, by means of a stop, $k$, secured to the shaft $h$, and having flat edges corresponding in number with the radial arms, and a flat spring, $j$, which rests against one side of the stop $k$. The top covering, $i$, is of sheet metal, and fills the space between the ends of the frame except where slotted for the passage of the radial arms of the wheels $d\ d$. A triangular plate, $l$, is also secured to the shaft $h$, for a purpose hereinafter explained. A reciprocating bar, $m$, slotted at $n$, and resting on the shaft $h$, which passes through said slot, is given a reciprocating motion by means of an arm, $o$, to which one end of said bar is attached, the arm $o$ being secured to and vibrated by the rock-shaft $e$. A projecting lug, $p$, is secured to the bar $m$ in such a position as to pass freely over the edge of the plate $l$, when said plate is in its normal position; but when the corner of said plate is raised by the partial rotation of the shaft $h$, to which it is secured, said corner is engaged by the lug $p$ at its next outward movement, and the shaft $h$, with its arms, is caused to make one-third of a revolution, as hereinafter more fully explained. The slot $n$ is made somewhat wider than the diameter of the shaft $h$, upon which it moves, for the purpose of allowing the lug $p$ to ride over the corner of the plate $l$, when said corner is raised during the inward stroke of the bar $m$. Narrow, flat, curved guides $r\ r$ are secured at one end to the frame of the binder, and the other ends, hanging free, serve to guide and hold the grain down as it is pressed against the arm g' by the packing-arms B B, and also to guide the gavel when it is discharged into the compressor.

C represents the arms for compressing and holding the gavel during the process of tying the band. These are made and operated in a manner similar to that described in my before-mentioned Letters Patent, except that I have provided a new means of giving motion to the rock-shaft and arms, by which said arms are closed. In my former device motion was imparted to said shaft by means of a belt passing from the driving mechanism around a pulley on said shaft, and the arms were held in position, when closed, by means of the forward movement of the belt alone. In this case the same shaft S is partially rotated and the arms C closed by means of an arm, t, Figs. 1 and 2, which receives a continuous vibratory motion from the complete revolution of the crank u, attached to shaft v, which is driven by the driving-wheel of the harvester through a pair of bevel-gears, or in any other suitable manner. The arm t and crank u are connected by the pitman w. The arm t moves loosely on the shaft S, and the shaft is caused to partially revolve by the clutch y, made to engage with the arm t by means of the treadle z, rod 2, and lever 3. A short arm, 4, is secured to the shaft S, its end being adapted to engage the ratchet-lever 5. A spiral spring, 6, is coiled about and attached to the shaft S in such a manner that when the arms C are closed said spring is put in tension, and by its recoil will act to open said arms. Movement is communicated from the shaft S to the arms C by means of the arms N and R and connecting-rods M and Q, as in my previous patent.

The operation of my device is as follows: The grain being delivered upon the apron b by the elevator A, it slides down and is pushed outward and straightened by the arms c, until it is caught and carried onward by the vibrating arms B B, which push it against the vertical arm g'. It is held down somewhat by the guides r r until a gavel has been formed. When the pressure against the arm g' becomes so great as to partially overcome the tension of the spring j, the arm g' is pushed by said pressure slightly outward, thus partially rotating the shaft h, to which it is secured, and the corner of the plate l is thereby raised into the path of the lug p on the reciprocating bar m, which, engaging the plate as it moves outward, further rotates the shaft h, and the next succeeding arm g² comes up behind the gavel, separating it from the unpacked straw, and, as it rises to a vertical position, throws the gavel into the compressing-arms C. At this moment the operator, who is carried by a seat secured to the frame of the harvester within convenient reach of the compressing-arms, places his foot upon the treadle z, which, operating the lever 3, causes the clutch y to engage with the vibrating arm t, by means of which the shaft S is partially rotated and the arms C closed, the band having been previously laid in them, thus compressing the gavel and carrying the band around it. The arm 4 now engages the ratchet-lever 5, and the gavel is held while the band is tied by the operator. The arm 4 is so arranged in relation to the arm t that it engages and is held by the ratchet-lever when the arm t has reached its extreme outward movement. As the arm t returns it simply slips back over the clutch y. When the band is tied, the operator removes his foot from the treadle, and the clutch y is returned to its normal position by a flat spring, 7. The treadle, being also drawn upward by the action of said spring, raises the long arm of the ratchet-lever 5, which rests upon it, thereby releasing the arm 4, and the shaft S is rotated backward by the recoil of the spring 6, the arms C are thrown open, and the operator removes the sheaf.

I claim as my invention—

1. The combination of the crank u, pitman w, vibratory arm t, clutch y, shaft S, arms N R, connecting-rods M Q, and compressing-arms C C, substantially as and for the purpose set forth.

2. The combination of the shaft S, provided with the short arm 4, the ratchet-lever 5, compressing-arms C C, and intermediate operating mechanism, substantially as and for the purpose set forth.

3. In a binder attachment for harvesters, a gavel forming and discharging device consisting of a chute for receiving the cut grain, radial arms attached to a central hub and arranged relatively to the chute so as to hold the grain therein, a yielding means for holding said arms successively in position across the discharge end of the chute, means for packing the grain in successive portions against one of said radial arms, means for discharging the gavel by producing a partial revolution of said arms, and means for connecting said discharging mechanism with the arms when sufficient grain has accumulated to form a gavel, whereby the discharge of the gavel is governed by the size of the same, all combined substantially as shown and described.

4. The combination of packers B B, arms g' g² g³, shaft h, stop k, spring j, plate l, and reciprocating bar m, whereby a gavel is formed in successive portions and discharged, and the discharge of said gavel made to depend upon its size, substantially as shown and described.

5. The combination of the treadle z, lever 3, clutch y, vibrating arm t, shaft S, having arm 4, the ratchet-lever 5, the compressing-arms C C, and intermediate operating mechanism, substantially as shown and described.

6. The combination of the clutch y, spring 7, treadle z, ratchet-lever 5, shaft S, having arm 4, the compressing-arm C C, the spring 6, and intermediate operating mechanism, substantially as shown and described.

MASON HEDRICK.

Witnesses:
MARSTON G. C. HARGROVE,
C. T. WALLACE.